United States Patent [19]

Dinan et al.

[11] Patent Number: 4,924,521
[45] Date of Patent: May 8, 1990

[54] IMAGE PROCESSING SYSTEM AND METHOD EMPLOYING COMBINED BLACK AND WHITE AND GRAY SCALE IMAGE DATA

[75] Inventors: Raymond F. Dinan, Mint Hill, N.C.; James F. Dubil, Wylie, S.C.; John R. Hillery, Charlotte, N.C.; Robert R. Rodite, Matthews, N.C.; James M. White, Charlotte, N.C.

[73] Assignee: International Business Machines Corporation, Armonk, N.Y.

[21] Appl. No.: 134,733

[22] Filed: Dec. 18, 1987

[51] Int. Cl.$^5$ .............................................. G06K 9/54
[52] U.S. Cl. ....................................... 382/54; 382/56; 382/42; 358/133; 358/135
[58] Field of Search ............................. 382/54, 56, 42; 358/133, 135

[56] References Cited

U.S. PATENT DOCUMENTS

| 4,032,977 | 6/1977 | Liao | 358/280 |
| 4,280,144 | 7/1981 | Bacon | 350/280 |
| 4,399,461 | 8/1983 | Powell | 382/54 |
| 4,558,371 | 12/1985 | Rallapalli et al. | 358/261.3 |
| 4,665,436 | 5/1987 | Osborne et al. | 358/135 |
| 4,776,026 | 10/1988 | Shimura | 382/56 |
| 4,817,181 | 3/1989 | Kamiya | 382/54 |

OTHER PUBLICATIONS

Troxel et al., "Bandwidth Compression of High Quality Images" ICC'80 1980 International Conference on Communications 8-12 Jun. 1980. 31.9/1-5.
Troxel et al., "A Two Channel Picture Coding System-Z-Real Time Implementation" IEEE Transaction on Comm. vol. Com-29, No. 12, Dec. 1981 p. 1841-1848.
Paul G. Roetling, "Visual Performance and Image Coding", Proceeding of the S.I.D., vol. 17/2 Second Quarter 1976, pp. 111-114.
Jack DiGiuseppe, "A Survey of Pictorial Data-Compression Techniques", The University of Michigan Technical Report 16, Concomp, Mar. 1969.
J. M. White, "Recent Advances in Thresholding Techniques for Facsimile", *Journal of Applied Photographic Engineering*, 6, No. 2, pp. 49-57 (1980).
James M. White, "Image Sampling, Resolution, and Gray-Scale", IBM Report Summarizing Presentation to the Image Quality Workshop, Mar. 26-27, 1984, in Yorktown, N.Y.

*Primary Examiner*—Leo H. Boudreau
*Assistant Examiner*—Yon Jung
*Attorney, Agent, or Firm*—Bell, Seltzer, Park & Gibson

[57] ABSTRACT

In order to reduce data storage and transmission bandwidth requirements, a high resolution gray scale image is represented in two separate image forms, namely, a high resolution, high sampling density black and white image and a lower resolution, lower sampling density gray scale image. Generating separate black and white and gray scale image data allows the use of either image form independently. The high resolution black and white image data and the low resolution gray scale image data may be recombined subsequently to produce reconstructed high resolution gray scale image data representing the image.

8 Claims, 3 Drawing Sheets

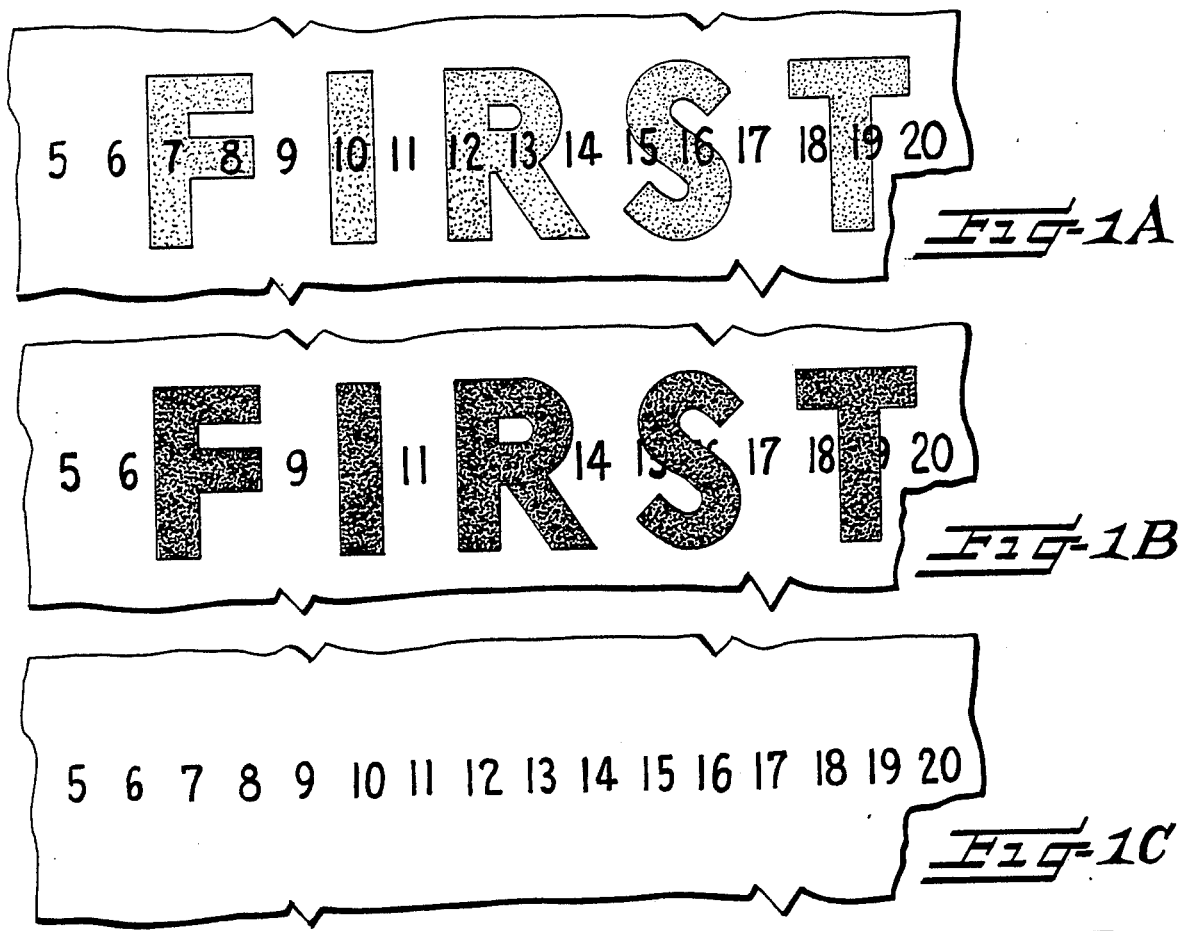
Fig-1A
Fig-1B
Fig-1C
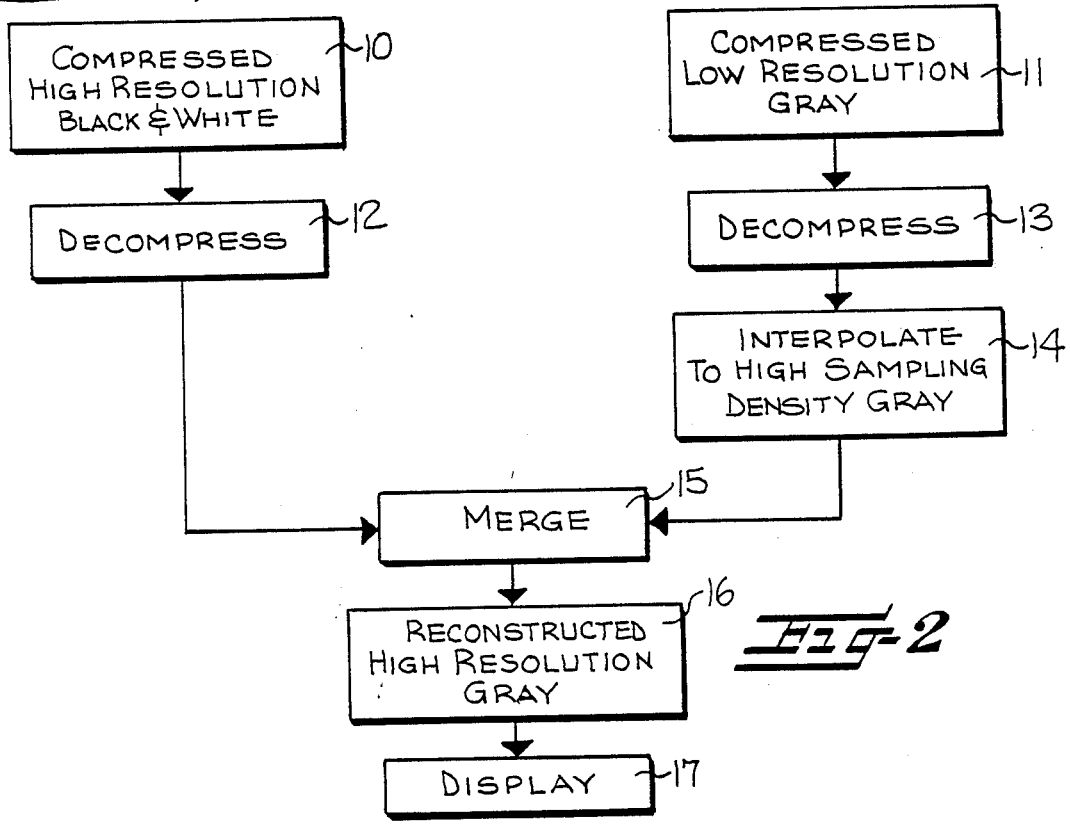
Fig-2

IMAGE PROCESSING SYSTEM AND METHOD EMPLOYING COMBINED BLACK AND WHITE AND GRAY SCALE IMAGE DATA

FIELD AND BACKGROUND OF THE INVENTION

This invention relates to the processing of image data, and more particularly to a system and method for producing high resolution gray scale image data representing an image.

The system and method of the present invention is especially useful in image processing systems wherein the images from documents, such as bank checks, are stored electronically in a computer system and the images may be subsequently retrieved for display or printing.

One such system is disclosed in commonly owned copending U.S. application Ser. No. 134,734, filed concurrently herewith (Attorneys Docket CT9-86-009). In this system, paper documents such as bank checks, are processed through a high speed reader/sorter. As the documents are processed, the magnetic ink characters on the documents are read by an MICR reader. In addition, the documents are directed past an image scanning station which electronically captures the image of both the front and back of the document.

Many kinds of documents, including bank checks, contain information in the form of sharp high contrast images, such as numbers and signatures, as well as broader, lower contrast images such as endorsements, printed inforaation, pictures, background designs and the like. Documents of this type cannot adequately be represented by black and white image data, since the thresholding of the image data into discrete black and white values results in loss of low contrast information. A high quality, high resolution gray scale image representation would adequately reproduce both high contrast images and lower contrast images, but would require massive amounts of data storage, which would be impractical and economically infeasible in a system that processes image data for high volumes of documents.

SUMMARY OF THE INVENTION

In order to reduce data storage and transmission bandwidth requirements, a high resolution gray scale image is represented in two separate image forms, namely, a high resolution, high sampling density black and white image and a lower resolution, lower sampling density gray scale image. Generating separate black and white and gray scale image data allows the use of either image form independently. The high resolution black and white image data and the low resolution gray scale image data may be recombined subsequently to produce reconstructed high resolution gray scale image data representing the image.

Thus, broadly the present invention provides a method for producing a high resolution gray scale representation of an image which comprises providing low resolution gray scale image data for the image, providing high resolution black and white image data for the image, and merging the low resolution gray scale image data and the high resolution black and white image data to produce reconstructed high resolution gray scale image data representing the image. The present invention also provides an image processing system for carrying out this method.

In merging the low resolution gray scale image data and the high resolution black and white image data, the low resolution gray scale image data is first interpolated by a two dimensional linear interpolation to high sampling density gray scale image data of the same sampling density as the black and white image data. Then the interpolated high sampling density gray scale data and the high resolution black and white image data are combined to produce the reconstructed high resolution gray scale image data.

The interpolated high sampling density gray scale image data suffers from loss of definition and detail, especially along high contrast boundaries, as a result of the earlier reduction in resolution. The gray scale values present in the interpolated high sampling density gray scale data represent averages of the gray scale values at the lower resolution. In combining the interpolated gray scale values with the high resolution black and white image data, a convolutional technique is employed to restore the lost definition and detail. In this technique, a sliding convolutional window is employed for generating for each successive data element of the high resolution black and white data a corresponding high resolution enhancement value based upon the sum of weighted values of that data element and a plurality of surrounding data elements. The derived high resolution enhancement value for each data element or pel is added to the interpolated high sampling density gray scale value for the corresponding pel to thereby produce the reconstructed high resolution gray scale image data.

BRIEF DESCRIPTION OF THE DRAWINGS

Some of the features and advantages of the invention having been stated, others will become apparent from the detailed description which follows, and from the accompanying drawings, in which FIG. 1A illustrates an image containing both high contrast information and low contrast information;

FIG. 1B illustrates the loss of image data and detail resulting from thresholding the image of FIG. 1A into black and white image data at a relatively low threshold level;

FIG. 1C illustrates the loss of image data and detail resulting from thresholding the image of FIG. 1A into black and white data at a higher threshold level;

FIG. 2 is a schematic diagram illustrating the procedure for producing reconstructed high resolution gray scale image data in accordance with the invention;

DESCRIPTION OF ILLUSTRATED EMBODIMENTS

Figure 3A:
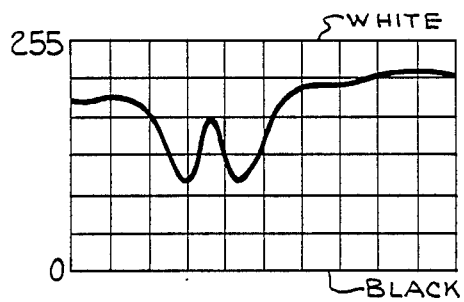
FIG. 3A is a graph representing a raster scan of an image.

Many paper documents, including checks, contain sharp, distinct markings such as machine printing and handwritten information. It is recognized that high resolution black and white (or binary) image form produces the best reconstructed image quality for the least amount of data quantity for these types of markings. However, those same documents may also contain less distinct, lower contrast markings such as scenic backgrounds and colored endorsements.

FIGS. 1A-1C illustrate the problems of using only black and white images. FIG. 1A shows the original image with the word FIRST printed in a relatively low contrast color, while in the background is a series of digits printed in high contrast black and white. FIG. 1B illustrates the result of attempting to capture the low contrast information represented by the word FIRST by using a relatively low black and white threshold value. It can be seen that high contrast data, represented by the digits underlying the letters of the word FIRST, are lost. FIG. 1C illustrates the black and white result of using a higher threshold value. In this instance, the lower contrast information represented by the word FIRST is lost. In instances where all of the information on a document is important, the best image representation is a high resolution gray scale image employing multiple levels of gray, e.g. 256 gray levels. However, this generally results in an unmanageable amount of image data, since gray scale image representation requires data on the level of grayness and thus inherently requires more storage than black and white information, which is represented by a single bit per picture element.

By representing the image separately by high resolution black and white image data (e.g. 240 pels per inch) and low resolution gray scale image data (e.g. 80 pels per inch) a reduction in the amount of data required to represent the image is realized. Either form of representation can be separately and independently utilized to recall and display the image. Another advantage of two separate representations is the availability of redundant information for certain parts of the document in the case of data errors. Still another advantage is the availability of a partial image for different applications. For example, signature verification and OCR applications may suitably use the black and white high resolution data, while in other applications, such as endorsement verification for example, only the gray scale data may be required. Both forms of image representation are kept separate through any image processing steps such as data reduction and compression and subsequent storage. When it is desired to recall and display or print the image in a high resolution gray scale form, the two image forms are decompressed and merged analytically into one image representation.

As shown in FIG. 2, high resolution black and white raster scanned image data at a resolution of 240 pels per inch is stored in compressed form as indicated at 10. Any of a number of well known data compression techniques, such as run length coding for example, can be employed to reduce the volume of data required to represent an image. Similarly, low resolution gray scale raster scanned image data at a resolution of 80 pels per inch is stored in compressed form as indicated at 11. Any of a number of well known data compression techniques can be utilized for reducing the volume of the gray scale data. In producing a reconstructed image, the compressed high resolution black and white image data is decompressed by a suitable decompression means 12 appropriate for the compression technique employed, and a separate decompression means 13 is used for decompressing the low resolution gray scale data.

In forming a reconstructed high resolution gray scale image, the decompressed low resolution gray scale image data is first expanded into high sampling density gray scale image data of the same sampling density as the black and white image data, as indicated at 14. This is achieved by suitable interpolation techniques, such as by two dimensional linear interpolation. Then the interpolated high sampling density gray scale is merged as indicated at 15 with the high resolution black and white data to produce reconstructed high resolution gray scale image data, as indicated at 16. This reconstructed data can be displayed on a suitable display device 17. More particularly, the merging of the interpolated high resolution gray scale data with the high sampling density black and white data employs a convolutional technique designed to restore lost definition and detail to the low resolution gray scale data. This technique involves generating high resolution enhancement values from weighted sums of the high resolution black and white image data to compensate for the loss of definition which results from the low resolution representation of the gray scale image data. These enhancement values are then added to the interpolated high sampling density gray scale data to thereby produce reconstructed high resolution gray scale image data.

The effect of the enhancement values is to subtract out the "smearing" or "averaging" effect of the low resolution gray scale representation. This will be better understood by referring to FIGS. 3A-3F, where FIG. 3A graphically represents the raster scan of an image.

Figure 3B:
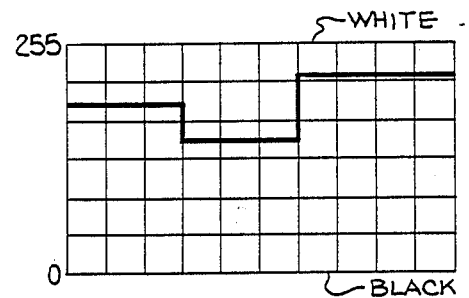
FIG. 3B is a graph illustrating a low resolution, low sampling density gray scale representation of the image of FIG. 3A.

FIG. 3B graphically represents a low resolution, low sampling density digitized gray scale form of the same image. Notice how the sharp peaks are reduced in amplitude, and in fact, the twin peaks are run together in the low resolution FIG. 3B.

Figure 3C:
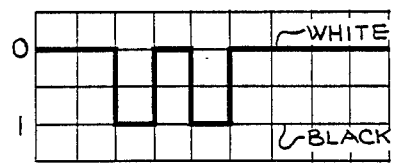
FIG. 3C is a graph illustrating a high resolution black and white (binary) image of the same image.

FIG. 3C shows the binary representation of FIG. 3A at high resolution, high sampling density. (The upper line in the curve is the "0", or white value, the lower line is the "1", or black value, consistent with the polarity of the gray-scale curves which are shown to range from 0 to 255.) Note that the high resolution binary image captures the fine details, but does not reproduce the overall gray shadings.

Figure 3D:
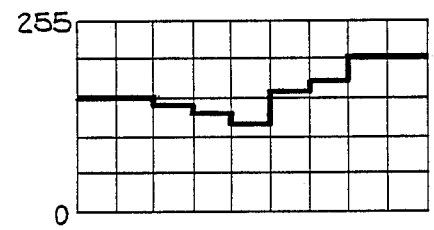
FIG. 3D is a graph illustrating an interpolated high sampling density gray scale image.

FIG. 3D shows the "smeared out" high sampling density gray scale which is derived by interpolation from the low resolution, low sampling density gray scale values of FIG. 3B. Although the image is now at the same high sampling density as the black and white image of FIG. 3C, it suffers from the same loss of definition and detail as FIG. 3B. The twin peaks of FIG. 3A are lost.

Figure 3E:
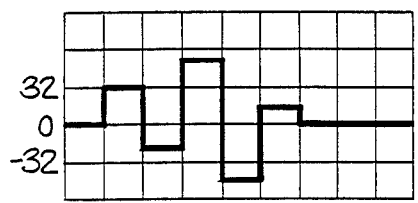
FIG. 3E is a graph illustrating on an expanded scale the enhancement values.

FIG. 3E represents the enhancement values, the output of the weighted window convolution process described in FIGS. 4 to 8. The exact shape of this curve depends on the binary values of the preceding and following lines, but what is shown is a typical type of curve. The vertical scale of this curve is increased to better demonstrate the process.

Figure 3F:
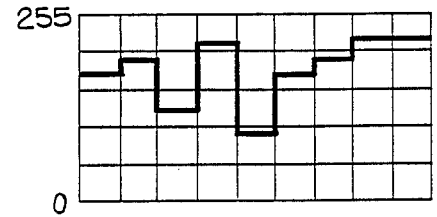
FIG. 3F is a graph illustrating the reconstructed high resolution gray scale image produced by combining the enhancement values of FIG. 3E with the interpolated high sampling density gray scale image of FIG. 3D.

FIG. 3F is the sum of the two previous curves. Note that the "mixed" or reconstructed high resolution curve of FIG. 3F contains the high resolution twin peaks of FIG. 3A and the overall grayscale value trends.

The method of recombining the interpolated high sampling density gray scale image data and the high scale black and white image data will be understood more fully from the detailed example which follows.

Figure 4:
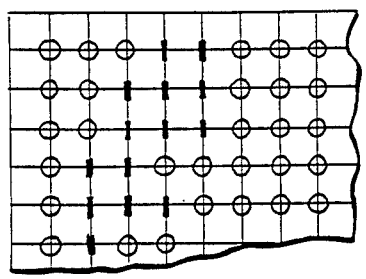
FIG. 4 is a schematic representation of a raster scanned black and white (binary) image, with the picture elements (pels) of the image shown as ones and zeros.
Figure 5:
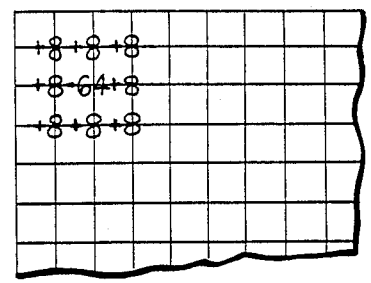
FIG. 5 illustrates the sliding convolutional window used to produce the high resolution enhancement values.
Figure 6A:
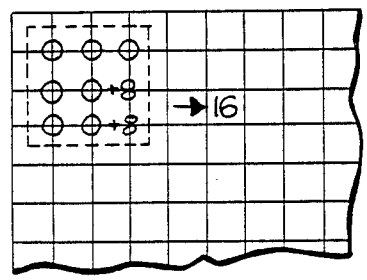
FIG. 6A-6D illustrate a sequence of steps and the results obtained when the sliding convolutional window is applied to the image of FIG. 4 to produce the enhancement values.

The matrix shown in FIG. 4 consists of the black/white high resolution pel values, of "1"'s and "0"'s which collectively define an image. FIG. 5 shows the convolutional weighting "window" used in generating the output values in FIG. 8. FIGS. 6A–6D show examples of how the window is used. In FIG. 6A, the window overlays the upper left-hand corner of the matrix of FIG. 4. The values shown in FIG. 6A are derived by multiplying, for each of the nine locations, the value of the weighting window by the value of the underlying pel (1 or 0). Thus, the corresponding right edge and lower right corner of the window have weighting values of +8, while the remaining values are zero. Adding up the products a net value of 16. Since the window is centered over location <2,2> of the matrix, the value of 16 is placed in the corresponding position <2,2> of the output matrix in FIG. 7.

Figure 6B:
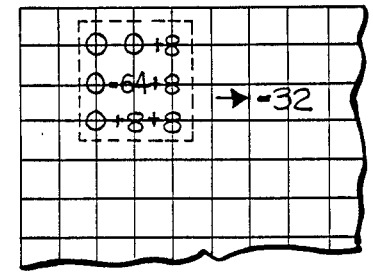
Figure 6C:
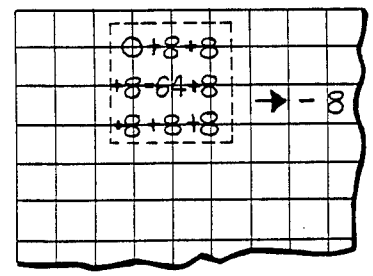
Figure 6D:
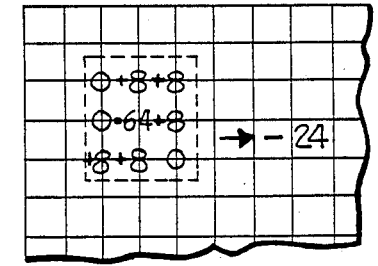
Figure 7:
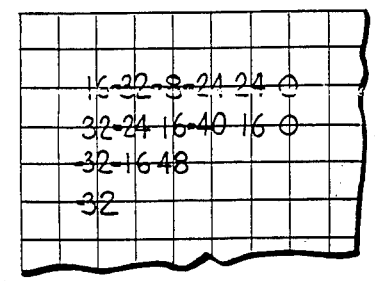
FIG. 7 illustrates the partially completed arrangement of enhancement values produced by applying the sliding convolutional window to the image of FIG. 4.

When the window is moved one position to the right, now centered over position <2,3>, as indicated in FIG. 6B, the contribution to the sum of products from elements <1,2>, <1,3>, <2,2>, and <3,2> is 0, the contribution from the other four perimeter squares is 8 each, for a total of 32, but now the central window weight of −64 is multiplied by the value "1" of element <2,3>, so that the entire total for this window position is −32. FIGS. 6C and 6D give another couple of examples. FIG. 7 has the result for all locations which can be calculated from the combination of the data in FIG. 4 and the window of FIG. 5. By assuming a border of "0"'s outside the perimeter of FIG. 4, we can then fill to the edges, i.e., extend FIG. 7 to FIG. 8.

Figure 8:
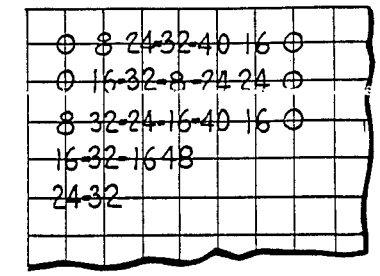
FIG. 8 is a view similar to FIG. 7, but with values along the borders completed.

The negative values in FIG. 8 represent a "blackening" of the gray scale values, which occurs on the "black side" of a character stroke in an image. The positive values represent a "whitening" of the gray scale which occurs on the "white side of the boundary. Note that for a large uniform area of all white or all black, the output would be zero since, if every element under the window is "0", then the sum of products would be zero. On the other hand, if every element under the window is "1", then the eight +8 terms around the perimeter of the window would exactly cancel the single −64 value in the center. This is a desirable result since the reconstructed high resolution gray scale values of uniform areas should be determined solely by the low-resolution gray scale data. Only at edges of areas do we desire to "sharpen" the contrast of the image.

The final step in the process is to add together the interpolated gray scale with the "windowed" black/white weighting values.

The weights in the window, FIG. 5, were selected to be used in a system where the whitest gray scale value is 255, and the blackest is 0. The signs of the elements in the window would be changed for reversed video, which has the blacker gray values numerically larger than the whiter gray values. The amplitudes of the windows may be increased or decreased proportionally to increase or decrease the effect of this "sharpness" process. The number of elements in the window (its size) may also be changed, but the 3 by 3 works well for a 3 times relationship between low resolution and high resolution images. For the reasons stated earlier, the sum of the window elements should be zero.

That which is claimed is:

1. An image processing system for producing high resolution gray scale image data representing an image, comprising:
   means defining low resolution gray scale image data which independently represents the image;
   means defining high resolution black and white image data which independently represents the image;
   means for merging the low resolution gray scale image data and the high resolution black and white image data to produce reconstructed high resolution gray scale image data representing the image, and comprising
   means for interpolating the low resolution gray scale data by a two-dimensional linear interpolation to high sampling density gray scale image data of the same sampling density as said black and white image data; and
   means for combining the interpolated high sampling density gray scale data with the black and white data to produce reconstructed high resolution gray scale image data representing the image, and including means for generating enhancement values from the high resolution black and white image data to compensate for the loss of defining resulting from representing the image with low resolution gray scale image data, and means for adding the thus generated enhancement values to the interpolated high sampling density gray scale image data to thereby produce the reconstructed high resolution gray scale image data.

2. An image processing system as set forth in claim 1 including means for storing the low resolution gray scale image data and the high resolution black and white image data in compressed form, and wherein the system includes means for decompressing the low resolution gray scale image data and the high resolution black and white image data.

3. An image processing system as set forth in claim 1 wherein said means for generating enhancement values from the high resolution black and white data comprises means for generating for each successive data element of the high resolution black and white data a corresponding enhancement value based upon the sum of weighted values of said data element and a plurality of surrounding data elements.

4. An image processing system for producing high resolution raster scanned gray scale image data representing an image, comprising:
   means defining gray scale raster scanned image data representing a gray scale value for each of a series of relatively low resolution pels of the raster scanned image;
   means defining black and white raster scanned image data representing a black or white value for each of a series of relatively high resolution pels of the raster scanned image;

means for interpolating the low resolution gray scale image data to produce high sampling density gray scale image data of the same sampling density as said black and white image data;

means for generating for each high resolution black and white pel, an enhancement value based upon the sum of weighted values of the black and white pel and the values of a plurality of surrounding black and white pels, said enhancement values serving to compensate for the loss of definition resulting from representing the image of low resolution gray scale image data, and means for adding the thus generated enhancement values to the gray scale values of the corresponding interpolated high sampling density gray scale data to thereby produce reconstructed high resolution gray scale image data representing the image.

5. A method for producing a high resolution gray scale representation of an image, comprising:

providing low resolution gray scale image data which independently represents the image;

providing high resolution black and white image data which independently represents the image;

merging the low resolution gray scale image data and the high resolution black and white image data to produce reconstructed high resolution gray scale image data representing the image, said step of merging comprising interpolating the low resolution gray scale data by a two-dimensional linear interpolation to high sampling density gray scale image data of the same sampling density as said high resolution black and white image data, and combining the interpolated high sampling density gray scale data with the black and white data to produce reconstructed high resolution gray scale image data representing the image, said combining step including generating enhancement values from the high resolution black and white image data to compensate for the loss of definition along high contrast boundaries resulting from representing the image with low resolution gray scale image data, and adding the thus generated enhancement values to the interpolated high sampling density gray scale image data to thereby produce the reconstructed high resolution gray scale image data.

6. A method as set forth in claim 5 wherein said step of generating enhancement values from the high resolution black and white data comprises generating for each successive data element of the high resolution black and white data a corresponding enhancement value based upon the sum of weighted values of said data element and a plurality of surrounding data elements.

7. A method as set forth in claim 5 wherein said high resolution black and white data comprises binary raster scan data representing the image, with each bit representing the value of a corresponding pel of the raster scan, and wherein said step of generating enhancement values from the high resolution black and white data comprises generating for each successive bit a corresponding enhancement value based upon the sum of the weighted values of the bits in a predetermined matrix surrounding said bit.

8. A method for producing high resolution gray scale raster scanned image data representing an image, comprising:

storing gray scale raster scanned image data representing a gray scale value for each of a series of relatively low resolution pels of the raster scanned image;

storing black and white raster scanned image data representing a black or white value for each of a series of relatively high resolution pels of the raster scanned image;

interpolating the low resolution gray scale image data to produce high sampling density gray scale image data of the same sampling density as said high resolution black and white image data;

generating for each high resolution black and white pel, an enhancement value based upon the sum of the weighted values of the black and white pel and the weighted values of a plurality of surrounding black and white pels, said enhancement values serving to compensate for the loss of definition along high contrast boundaries resulting from representing the image by low resolution gray scale image data, and adding the thus generated enhancement values to the gray scale values of the corresponding interpolated high sampling density gray scale data to thereby produce reconstructed high resolution gray scale image data representing the image.

* * * * *

UNITED STATES PATENT AND TRADEMARK OFFICE
CERTIFICATE OF CORRECTION

PATENT NO. : 4,924,521

DATED : May 8, 1990

INVENTOR(S) : Raymond F. Dinan, et al.

It is certified that error appears in the above-identified patent and that said Letters Patent is hereby corrected as shown below:

On the title page item [75] under the section "Inventors", the address for inventor James F. Dubil should be -- Lake Wylie, S.C. -- instead of "Wylie, S.C.".

Column 1, line 19, "application" should be -- Application --.

Column 1, line 33, "inforaation" should be -- information --.

Column 5, line 31, after "products" insert -- gives --.

Column 6, line 38, "defining" should be -- definition --.

Column 7, line 14, "of" should be -- by --.

Signed and Sealed this

Twenty-first Day of April, 1992

Attest:

HARRY F. MANBECK, JR.

*Attesting Officer*    *Commissioner of Patents and Trademarks*